Figure 1:
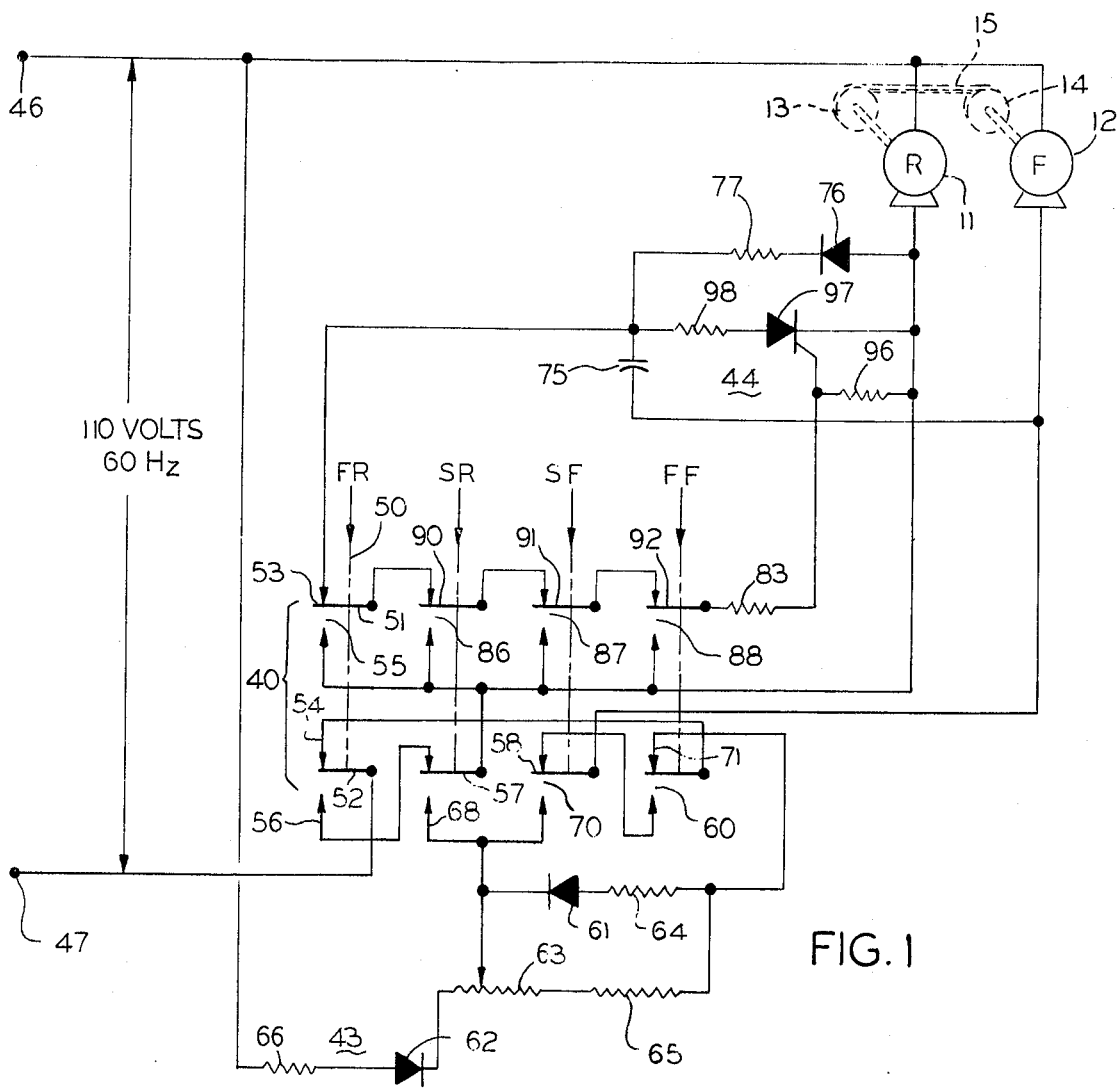

United States Patent [19]

Dahlen et al.

[11] 4,079,296

[45] Mar. 14, 1978

[54] VARIABLE SPEED AC MOTOR CONTROL CIRCUIT

[75] Inventors: Theodore E. Dahlen, West Bend; Rashmikant P. Shah, Hartford, both of Wis.

[73] Assignee: Bell & Howell Company, Chicago, Ill.

[21] Appl. No.: 700,679

[22] Filed: Jun. 28, 1976

[51] Int. Cl.² ............................................. H02P 1/56
[52] U.S. Cl. .................................... 318/7; 318/56; 318/60; 318/86; 318/227
[58] Field of Search .................. 318/7, 56, 60, 63, 86, 318/227

[56] References Cited

U.S. PATENT DOCUMENTS

| | | | |
|---|---|---|---|
| 3,218,529 | 11/1965 | Evans et al. | 318/60 X |
| 3,444,445 | 5/1969 | Mullin | 318/60 X |
| 3,531,703 | 9/1970 | Plumpe, Jr. | 318/227 X |
| 3,758,834 | 9/1973 | Inoue | 318/7 X |
| 3,794,898 | 2/1974 | Gross | 318/380 |

*Primary Examiner*—B. Dobeck
*Attorney, Agent, or Firm*—Robert A. Walsh; Alan B. Samlan

[57] ABSTRACT

A microfilm reader has a film transport mechanism driven by separate forward and reverse motors. During operation, the driven one of the motors receives full AC power for driving it at high speed. During low speed operation, the driven motor receives partial power during half-cycles of one polarity, but only minimal power during half-cycles of opposite polarity. The undriven motor is pulled by its associated reel as the film is unwound therefrom. A large capacitor, which is part of a series circuit including both the forward and reverse motors, charges while either motor runs. When a driven motor is stopped, the capacitor is discharged into both of the motors to provide a unipolar field which produces a braking torque. Thus, the capacitor discharge not only stops the driven motor quickly and efficiently, but also stops the undriven motor to maintain film tension.

3 Claims, 2 Drawing Figures

U.S. Patent

March 14, 1978

4,079,296

VARIABLE SPEED AC MOTOR CONTROL CIRCUIT

This invention relates primarily to AC motor control circuits and more particularly to circuits for selectively controlling two AC motors, with a quick stop braking and film or tape tension maintenance.

Very often two motors are used when it is either necessary or desirable to control machinery which can independently perform either of two functions. For example, one motor may be used to drive a microfilm transport system in a forward direction and a second motor may be used to drive it in a reverse direction. Sometimes it is desirable to run such a film at a high or searching speed and other times it is desirable to run it at a slow or a frame selection speed. Therefore, if either motor operates at full speed, the film travels at a fast speed, and if it operates at a slow speed, the film travels at a slow speed.

Heretofore, it has been difficult to control the speed of an AC motor since it tends either to run at full speed or to lose torque and stall if it begins to slow. This is particularly true when there is a dramatic difference between high and low speeds. For example, it has been the practice to use a gear train whenever it was necessary to drop from a relatively high maximum speed 3000 RPM to an extremely low speed of, say, 50 RPM. Such a gear train is expensive, complex, and subject to wear.

Whenever the microfilm travels, there comes a time when it approaches and then arrives at a specific location where such travel should stop. A stopping at the exact film location is important since a selected microfilm frame should then be precisely positioned in a specific optical path, ready for projection. Thus, any coasting of a de-energized motor cannot be tolerated.

Another problem is that both motors are turning at the time when the film is stopped, one motor being driven and the other undriven motor merely turning responsive to the unwinding of film from its associated reel (hereinafter called "wind milling"). If only the driven motor is stopped, the windmilling motor will continue coasting to unwind its film onto the floor. Therefore, to maintain proper film tension and to prevent unwanted unwinding, it is necessary to brake both motors.

Accordingly, an object of the invention is to provide a new and novel two speed control circuit for AC motors. Here an object is to provide means for driving an AC motor at either a high or a low speed, with the high speed being in the order of one thousand times greater RPM than the low speed RPM. In this connection, an object is to drive an AC motor at such a low speed, without an excessive loss of available torque.

Another object of the invention is to provide a control circuit for selectively energizing either one of two motors at either of two voltage levels in order to cause a mechanical response in either of two directions and at either of two speeds. Still another object is to provide such a control circuit which also is arranged to stop a pair of motors very rapidly, upon a circuit operation. Here an object is to so stop both of the two motors in order to maintain proper film tension.

Yet another object of the invention is to provide a new and improved microfilm drive control circuit. In this connection, an object is to provide a microfilm transport control means which can call up and stop precisely at a specific frame.

According to an aspect of the invention, these and other objects are accomplished by providing a large capacitor which may be switched into a series circuit that includes both a forward and a reverse motor. When a driven motor and a windmilling motor are to be stopped, the capacitor is discharged into both of the motors to counter the energy in the driven motor which is then producing the torque of that motor and to produce a counter torque in the windmilling motor. This discharge current stops both of the motors quickly and efficiently.

Figure 2:
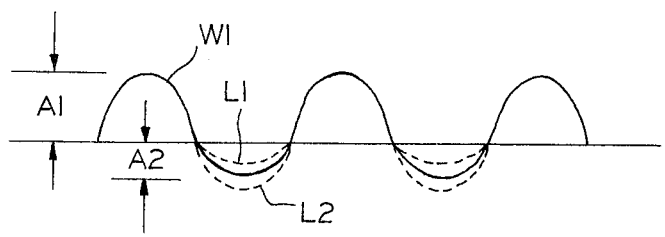

The nature of a preferred embodiment of the invention will become more apparent from a study of the attached drawing, wherein:

FIG. 1 is a schematic circuit diagram showing a two motor control circuit with quick stop braking and film tension maintenance features; and FIG. 2 is a graph which explains how an extremely low speed is obtained from either motor.

Preferably, the inventive motor control operates a film transport mechanism, as shown in FIG. 1 by a reverse motor 11, a forward motor 12, a film supply reel 13, a film take up reel 14, and a length of film 15 therebetween. The forward motor 12 individually drives the film take up reel 14, and the reverse motor 11 individually drives the film rewind or supply reel 13. The film 15 extending between the two reels, during operation of a microfilm reader, is held under tension by the resistance to rotation offered by the windmilling motor, and on stopping, tension is held by the braking of the windmilling motor.

The inventive circuit for controlling two motors is shown in FIG. 1. In greater detail, the major portions of the circuit shown in the drawing are a set of control switches 40, two motors 11, 12, a slow speed control circuit 43, and a stopping control circuit 44. The power is supplied through terminals 46, 47 from any commercial (preferably 110V/60Hz) or other suitable source.

The switches 40 are any suitable form of controllable devices, such as push buttons, relays, or the like. The four switches are designated FF (fast forward), SF (slow forward), SR (slow reverse), and FR (fast reverse). As indicated by dot-dashed lines, each switch has two armatures which are operated together responsive to a force acting in the direction indicated by an arrowhead. For example, any force (such as a depression of a push button) acting in a direction indicated by the arrowhead on dot-dashed line 50, moves armatures 51, 52 to open contacts 53, 54 while closing contacts 55, 56. The three other switches operate corresponding contacts in a similar manner responsive to a force along the corresponding dot-dashed lines.

The inventive drive provides a variable speed, fast braking film drive control circuit and mechanism using shaded pole motors. The speed of these motors is controlled by proportioning the amount of DC and AC drive currents applied to them. If a DC braking signal is applied to the motor, via a resistor, it is fairly effective, but unfortunately that leaves the motor drawing the heavy braking current at all times, even while it is stopped. Therefore, the invention avoids a continuous current drain by discharging a large capacitor via a resistor, which supplies a momentary heavy surge of direct current for braking, after which no further braking current is either applied or needed.

In greater detail, the lower pairs of contacts (e.g., 54, 56), on switches 40, control the supply of the fast or slow drive current and the upper pairs of contacts (e.g. 53, 55) control the application of the braking current. For example, when the fast reverse switch FR is operated, a circuit is completed from line terminal 47, through lowermost operated contacts 52, 56, resting contacts 57 and reverse motor 11 to line terminal 46. When the fast forward switch FF is operated, a circuit is completed from line terminal 47 through contacts 52, 54, lowermost contact 60, resting contacts 58, and forward motor 12 to line terminal 46. Either way, the full line voltage is applied to drive one of the motors, at its full speed.

The principle of the slow speed control is that the motor is energized at different amplitudes or levels during successive half cycles of the energizing current, owing to the use of a half-wave rectifier. More specifically, the slow speed control circuit 43 includes a pair of rectifier diodes 61, 62, a speed control potentiometer 63 and several current limiting resistors 64, 65, 66. When terminal 47 is of positive polarity at slow speed, rectifier diode 61 conducts via contacts 52, 54, 71, resistor 64, diode 61, an operated slow speed key SR or SF, and the selected motor 11 or 12 to terminal 46. Current is limited by resistors 64, 65 and potentiometer 63. During half-cycles, while terminal 47 is negative, diode 61 is back biased and current from terminal 47 is limited by the high resistance of resistor 65 and potentiometer 63.

The current for driving the motor at a slow speed is seen in FIG. 2. When the line terminal 47 is positive, diode 61 conducts, and practically a full and undistorted half-cycle wave W1 is applied to the energized motor, at an amplitude A1 limited only by resistor 64, in parallel with resistor 65 and potentiometer 63.

When the terminal 47 is negative, diode 61 is back biased and current flows only through resistor 65 and potentiometer 63 to the energized motor. The negative half-cycle amplitude A2 is adjustable at potentiometer 63 and is greatly reduced, as compared to the amplitude A1 of the positive half-cycle. This reduced current may be controlled by potentiometer 63, as indicated by dotted lines L1, L2, to provide differences in slow speed. The result is that driving energy is delivered to the motor during each positive half-cycle. During the negative half-cycles, the motor receives only a small amount of energy which maintains the polarities in the motor which are required to keep the rotor turning. This results in a reduced AC level combined with an effective DC level which is being applied to the motor.

This way, the motor may be driven at extremely slow speeds, without an excessive loss of torque. Moreover, the amplitudes A1, A2 of the two half-cycles may be controlled separately.

If the slow forward SF switch is operated, during the half-cycles while terminal 47 is at a positive polarity, a circuit may be traced from the line terminal 47 through contacts 52, 54, 71, resistor 64, diode 61, (and through parallel resistor 65 and potentiometer 63), contacts 70 and forward motor 12 to line terminal 46. While terminal 47 is a positive polarity, diode 62 is back biased and cannot conduct.

When terminal 47 becomes negative and terminal 46 becomes positive, the back bias is removed from diode 62. The motor 12 is now energized from a voltage divider comprising the series circuit resistor 66, diode 62, potentiometer 63, and resistor 65, which series circuit is connected between the terminals 46, 47. Resistor 66 and diode 62 serve to control the voltage applied to the motor, independently of the impedance of the motor itself, when the potentiometer 63 is at its lowest speed setting. This resistor/diode combination adds damping to reduce cogging when the motors are being operated at slow speeds.

When the slow reverse switch SR is operated, the motor 11 is energized via the slow speed circuit 43, which may be traced (during positive half-cycles) from line terminal 47 through contacts 52, 54, 71, resistor 64, diode 61, (and in parallel resistor 65 and potentiometer 63), contacts 68 and reverse motor 11 to line terminal 46. When line terminal 46 becomes positive, the diode 62 becomes forwardly biased and the reverse motor 11 is energized from the voltage divider including resistor 66, potentiometer 63 and resistor 65 in parallel combination.

According to the invention, braking is accomplished when any of the speed control switches 40 is returned to normal. In general, quick braking occurs because a large capacitor 75 is discharged into the motors, in series, with current applied in a manner which opposes continued rotation of the motors.

In greater detail, during normal conditions with no switch 40 operated, there is an open circuit at contacts 56, 68, 70, 60 to prevent capacitor 75 from charging.

Capacitor 75 charges when any one of the switches 40 is operated, with charging via one of two circuits depending upon which of the two motors 11 or 12 is operating. For the reverse motor 11, assume first that switch FR is operated. Contacts 53 are opened to remove the input voltage to the firing circuit for the silicon controlled rectifier (SCR) 97. The charging circuit may be traced from line terminal 47 through operated contacts 52, 56, 57, diode 76, resistor 77, capacitor 75 and the winding of motor 12 to the line terminal 46. For the forward motor 12, assume next that switch FF is operated. The charging circuit may be traced from line terminal 47 through contacts 52, 54, 60, 58, capacitor 75, resistor 77, diode 76 and motor 11 to terminal 46. During the charging over either path, the non-operating motor receives a pulsating current, but does not operate. For several AC half cycles, the current charging the capacitor 75 and passing through the undriven motor, produces a slight braking effect upon the undriven motor. Therefore, the film starts up somewhat less rapidly than it otherwise would; however, the effect is entirely secondary, virtually unnoticeable, and acceptable. While the driven motor is operating, a film or tape is being pulled from one reel and wound upon the other reel. The unwinding reel turns the undriven or windmilling motor.

According to the invention, when the driven motor is to be stopped, the operated one of the switches 40 is returned to normal. Responsive thereto, one of the contacts 56, 68, 70 or 60 opens the circuit which had been energized to drive the motor. One of the contacts 53, 90, 91, or 92 closes to complete a circuit from the junction of capacitor 75 and resistors 77 to the gate of SCR 97, which switches on to carry the heavy discharge current from capacitor 75. This current might otherwise damage the contacts on switches 40.

All of the charge remaining on the capacitor 75 discharges through the series circuit traced from capacitor 75 through the current limiting resistor 98, SCR 97, the reverse motor 11, and forward motor 12, to the capacitor 75. At this time, diode 76 is back biased by the discharging current. The resistor 98 stretches the capacitor 75 discharge time to coincide with the characteristic stopping time for the driven motor and a counter torque of the windmilling motor. The driven motor stops and the windmilling motor applies a back tension to the film or tape.

In operation, a person who is using the microfilm reader selects a desired film transport mode of operation and pushes a corresponding button. For example, if a slow forward mode is selected, push button SF is operated. Likewise, any other push button would be operated if another mode is selected.

Responsive to operation of push button SF, a circuit is completed from terminal 47 through slow speed circuit 43, contacts 70, and the forward motor 12 to terminal 46. The motor receives energizing current, as depicted in FIG. 2, with greater power at amplitude A1 during positive half cycles at terminal 47 and with a minimal power during negative half cycles. As long as switch SF remains operated, the motor 12 continues to rotate slowly.

When the person operating the microfilm reader sees that a desired frame has been found, switch SF is returned to normal. At this time, the motor 12 is deenergized by opening contacts 70 and contacts 91 close to apply a voltage divided by resistors 83, 96 to trigger the SCR 97. Resistor 96 damps any transients which may occur. As soon as the SCR 97 is triggered, a heavy direct current flows from capacitor 75 through resistor 98 and the SCR 97 and both motors, in series. This brings the two motors to an immediate and complete stop, without loss of tension to prevent any random unwinding of the film or tape.

The advantages of the invention should now be apparent. The control circuit operates AC motors at either of two speeds which are grossly different, such as 3000 RPM and 50 RPM, for example. When deenergized at either speed, the motor stops almost instantaneously with virtually no coasting by either motor. The circuit is simple, low cost, and reliable — eliminating a need for expensive gears and brakes.

While the invention has been described in connection with a microfilm reader, it is not limited thereto. Quite the contrary, the invention has utility in conjunction with virtually any AC motor control devices. Therefore, the appended claims are to be construed to cover all equivalents falling within the true scope and spirit of the invention.

We claim:

1. An AC motor control means for use with a pair of AC motors, one of said motors being connected to a supply side of a film or tape transport mechanism and the other of said motors being connected to a take-up side of said film or tape transport mechanism, whereby said two motors maintain tension on said film or tape, means whereby either of said motors may be a driven motor and the other of said motors is windmilling responsive to the pull being exerted upon the film by the driven motor, a large capacitor, means for charging said capacitor while one of said motors is being driven by power from an AC source and the other of said motors is windmilling, and means responsive to removal of said AC power from said driven motor for discharging said capacitor into both said driven motor and said windmilling motor during a stopping mode in order to maintain film tension in said film and to counter the inertia existing in the motors and systems driven thereby, wherey the discharge of said capacitor stops the motors quickly and efficiently.

2. The motor control means of claim 1 and switch means for selecting one of a plurality modes of operation for operating either of said two motors at either of two speeds, means responsive to said mode selecting means for selectively energizing either of said motors with a full wave in order to drive said selected motor at a high speed, means also responsive to said mode selecting means for energizing either of said motors responsive to half-waves of one polarity and for energizing said motor responsive to greatly attenuated half-waves of opposite polarity when a slow speed mode is selected.

3. The motor control means of claim 1 wherein said capacitor discharging means comprises a series circuit including the windings of said two motors, said capacitor, and an electronic switch, means responsive to operating one of said motors for charging said capacitor via the windings of the other and undriven one of said motors, and means responsive to restoration of said mode selecting switch means for discharging said capacitor with discharge through said electronic switch and into said series circuit.

* * * * *